(12) United States Patent
Price et al.

(10) Patent No.: US 9,372,272 B2
(45) Date of Patent: Jun. 21, 2016

(54) EARTHQUAKE WARNING SYSTEM

(75) Inventors: Michael John Price, Palo Alto, CA (US); Gilead Wurman, Union City, CA (US)

(73) Assignee: Seismic Warning Systems, Inc., Sunnyvale, CA (US)

( * ) Notice: Subject to any disclaimer, the term of this patent is extended or adjusted under 35 U.S.C. 154(b) by 285 days.

(21) Appl. No.: 13/993,394

(22) PCT Filed: Dec. 19, 2011

(86) PCT No.: PCT/US2011/065733
§ 371 (c)(1),
(2), (4) Date: Aug. 27, 2013

(87) PCT Pub. No.: WO2012/083294
PCT Pub. Date: Jun. 21, 2012

(65) Prior Publication Data
US 2013/0328688 A1 Dec. 12, 2013

Related U.S. Application Data

(60) Provisional application No. 61/424,193, filed on Dec. 17, 2010, provisional application No. 61/424,175, filed on Dec. 17, 2010, provisional application No. 61/424,165, filed on Dec. 17, 2010.

(51) Int. Cl.
*G08B 21/00* (2006.01)
*G01V 1/00* (2006.01)
*G08B 21/10* (2006.01)

(52) U.S. Cl.
CPC .............. *G01V 1/008* (2013.01); *G08B 21/10* (2013.01); *G01V 2210/65* (2013.01)

(58) Field of Classification Search
USPC ........................................................ 340/690
See application file for complete search history.

(56) References Cited

U.S. PATENT DOCUMENTS 3,707,699 A * 12/1972 Sanctuary ................. G01S 5/22
273/372
4,516,206 A * 5/1985 McEvilly ............... G01V 1/288
367/40

(Continued)

FOREIGN PATENT DOCUMENTS

CN 101354757 A 1/2009
CN 101567124 A 10/2009

(Continued)

OTHER PUBLICATIONS

Agius et al.; A Single-Station Automated Earthquake Location System at Wied Dalam Station—Malta; Seismol Res Lett; 82(4):545-559; Jul./Aug. 2011.

(Continued)

*Primary Examiner* — Jennifer Mehmood
*Assistant Examiner* — Rufus Point
(74) *Attorney, Agent, or Firm* — Shay Glenn LLP

(57) ABSTRACT

A method or system for detecting a seismic event includes detecting a primary wave of a seismic event using at least one sensor at a measurement location; using at least one parameter of the detected primary wave to determine an estimated peak ground intensity at the measurement location without determining the magnitude of the seismic event; determining an epicenter of the seismic event; and estimating the intensity of the seismic event at a specified location using the determined estimated peak ground intensity and the distance of the specified location from the epicenter. The epicenter can be determined using sensors at a single location. A noise detection system can filter out detected signals that correspond to local vibrations rather than seismic events.

90 Claims, 7 Drawing Sheets

(56) References Cited

U.S. PATENT DOCUMENTS

| | | | |
|---|---|---|---|
| H000374 H * | 11/1987 | Abo-Zena | G01S 3/74 342/378 |
| 5,724,241 A * | 3/1998 | Wood | G01V 1/20 702/14 |
| 5,771,170 A * | 6/1998 | Withers | G01V 1/008 702/14 |
| 5,910,763 A | 6/1999 | Flanagan | |
| 5,983,162 A * | 11/1999 | Huang | G06F 17/14 702/15 |
| 6,208,247 B1 | 3/2001 | Agre et al. | |
| 6,654,689 B1 | 11/2003 | Kelly et al. | |
| 6,791,901 B1 * | 9/2004 | Robertsson | G01V 1/003 181/110 |
| 6,816,878 B1 | 11/2004 | Zimmers et al. | |
| 7,005,993 B2 | 2/2006 | Webb et al. | |
| 7,196,634 B2 * | 3/2007 | Cherry | G01V 1/008 340/690 |
| 7,280,920 B1 * | 10/2007 | Whiteside | G01V 1/008 702/15 |
| 7,353,114 B1 | 4/2008 | Rohlf et al. | |
| 7,463,162 B1 | 12/2008 | Hosseini | |
| 8,519,860 B2 | 8/2013 | Johnson et al. | |
| 2003/0184445 A1 | 10/2003 | Chen et al. | |
| 2005/0027571 A1 | 2/2005 | Gamarnik et al. | |
| 2005/0280421 A1 | 12/2005 | Yomoda et al. | |
| 2007/0104028 A1 * | 5/2007 | Van Manen | G01V 1/003 367/38 |
| 2007/0144242 A1 * | 6/2007 | Matsumiya | G01V 1/008 73/82 |
| 2007/0279239 A1 | 12/2007 | Lachenit et al. | |
| 2009/0033511 A1 | 2/2009 | Komiya et al. | |
| 2009/0054079 A1 | 2/2009 | Dubinsky | |
| 2009/0295587 A1 | 12/2009 | Gorman, Jr. | |
| 2010/0169021 A1 | 7/2010 | Moisio | |
| 2010/0207776 A1 * | 8/2010 | Takuno | H04M 11/04 340/690 |
| 2011/0037588 A1 | 2/2011 | Zeng et al. | |
| 2013/0328688 A1 * | 12/2013 | Price | G01V 1/008 340/690 |

FOREIGN PATENT DOCUMENTS

| | | |
|---|---|---|
| CN | 101577036 A | 11/2009 |
| CN | 101630011 A | 1/2010 |
| EP | 2256520 A2 | 12/2010 |
| JP | H06-221912 A | 8/1994 |
| JP | 2000-121743 A | 4/2000 |
| JP | 2002-168964 A | 6/2002 |
| JP | 2003-114281 A | 4/2003 |
| JP | 2005-195366 A | 7/2005 |
| JP | 2006-078297 A | 3/2006 |
| JP | 2007-198813 A | 8/2007 |
| JP | 2007-298446 A | 11/2007 |
| JP | 2008-522140 A | 6/2008 |
| JP | 2009-174979 A | 8/2009 |
| JP | 2010-91480 A | 4/2010 |
| JP | 2010-230407 A | 10/2010 |
| JP | 2010276536 A | 12/2010 |
| KR | 2003-24722 Y1 | 8/2003 |
| TW | 200847073 A | 12/2008 |

OTHER PUBLICATIONS

Boatwright et al.; The Dependence of PGA and PGV on Distance and Magnitude Inferred from Northern California ShakeMap Data; Bulletin of the Seismological Society of America; 93(5):2043R2055: Oct. 2003.

Convertito et al.; Prediction of Response Spectra via Real-Time Earthquake Measurements; Soil Dynamics and Earthquake Eng; 28(6):492-505; Jun. 2008.

Iervolino et al.; Real-Time Risk Analysis for Hybrid Earthquake Early Warning Systems; J Earth Eng; 10(6):867-885; Nov. 2006.

Kuehn et al.; A Naive Bayes Classifier for Intensities Using Peak Ground Velocity and Acceleration; Bulletin of the Seismological Society of America;100(6):3278R3283,; Dec. 2010.

Rydelek et al.; Real-Time Seismic Warning with a Two-Station Subarray; Bulletin of the Seismological Society of America; 94(4):1546-1550; Aug. 2004.

Wald et al; ShakeMap® Manual, Technical Manual, Users Guide, and Software Guide; USGS; 156 pgs; Jun. 19, 2006.

Price et al.; U.S. Appl. No. 13/985,136 entitled "Customizable Policy Engine," filed Oct. 2, 2013.

* cited by examiner

EARTHQUAKE WARNING SYSTEM

CROSS REFERENCE TO RELATED APPLICATION

This application claims priority to U.S. Provisional Application No. 61/424,165, filed Dec. 17, 2010, titled "Earthquake Warning System." This application also claims priority to U.S. Provisional Application No. 61/424,193, filed Dec. 17, 2010, titled "Rapid, Reliable Networked Earthquake Warning System." This application also claims priority to U.S. Provisional Application No. 61/424,175, filed Dec. 17, 2010, titled "Rapid, Reliable Earthquake Warning System." All of the above referenced applications are incorporated herein by reference in their entireties.

INCORPORATION BY REFERENCE

All publications and patent applications mentioned in this specification are herein incorporated by reference to the same extent as if each individual publication or patent application was specifically and individually indicated to be incorporated by reference.

FIELD

This application relates generally to detecting and warning of earthquakes. In particular, this application relates to determining the intensity of an earthquake without estimating the magnitude, to estimating epicenter location with a single station, and to reducing noise in sensed signals.

BACKGROUND

Earthquake Warning Systems (EWS) rely on rapid detection and characterization of earthquake ground motions to provide alerts in advance of hazardous shaking. Most present EWS are designed to detect the start of an earthquake by sensing the arrival of P-waves and analyzing the P-wave to estimate the magnitude of the ongoing event via an empirical relationship between some property of the P-wave and the magnitude of historic earthquakes. The P-wave arrival times at several stations are used to estimate the event's epicenter. The estimated magnitude and epicenter are then used to estimate the intensity of impending ground motions, using an empirical relationship between magnitude, epicentral distance and intensity of ground motion. The amount of warning a P-wave based EWS can provide is proportional to the distance from the epicenter. A general rule of thumb is 1 second for every 8 km.

This technique leads to a multiplication of uncertainties between the estimation of magnitude from P-waves and intensity from the magnitude. In addition, time is of the essence in earthquake warnings, and this two-step estimation increases the computation time unnecessarily. The measurement uncertainty in the estimate is typically not reported along with the estimate itself, leading to a discontinuous response behavior in which a slight change in estimated ground motion leads to a drastically different response due to a particular threshold having been exceeded. For example, say an alarm is to be sounded for an estimated intensity of 5 or greater in some arbitrary scale. Without reporting the uncertainty in the estimate, the response for an estimated intensity of 4.999 is drastically different from the response for an estimated intensity of 5.000. In the latter case the alarm is sounded whereas in the former case, for a very similar ground motion estimate, no alarm is sounded. If, however, if the two estimated intensities are statistically indistinguishable because of their respective error ranges, the warning or other response to the estimates should not differ.

Other EWS rely on the detection of the S-wave at a sufficient distance to provide warning of intense shock waves. The amount of warning time possible is less, since the S-waves travel more slowly than P-waves, but some of the uncertainty in the estimate of intensity is reduced by waiting to directly measure the S-waves. This approach works best when likely epicenters are sufficiently far from population centers to provide time for remote sensors to wait for the S-wave and still be able to provide useful warning. Such a system warns Mexico City of earthquakes originating on the coast.

EWS designs are varied, but can be generally characterized as standalone or networked. A standalone EWS uses local sensing devices to make a strictly local decision about whether or not an earthquake has started and whether or not it is of sufficient intensity to justify the initiation of protective actions. These systems can react quickly to the arrival of a P-wave but may suffer from questionable false positive performance. A standalone device that relies on S-wave detection is normally called a seismic switch. These provide no warning of the earthquake, since they respond only after serious shaking begins, but can initiate actions that may prevent damage.

A networked EWS comprises geographically dispersed sites placed to minimize the distance to likely earthquake epicenters near likely epicenters. When an earthquake occurs, the P-waves travel outwards arriving first at the closest site which then sends a signal to all other affected sites. The warning time that the EWS can provide is better than the warning time possible with each standalone site, since the signal from the closest site will arrive at the other sites well before the arrival of the P-waves.

The normal warning time for a standalone system is given by the equation:

$$t_{warn-standalone} = t_s - t_p$$

Where $t_s$ is the travel time for the S-wave from the hypocenter to the site and $t_p$ is the travel time for the P-wave from the hypocenter to the site. These travel times are:

$$t_s = \frac{d}{V_S}$$

$$t_p = \frac{d}{V_P}$$

Where d is the distance from the hypocenter to the site, $V_s$ is the S-wave velocity, and $V_p$ is the P-wave velocity. For a Poisson solid (a good approximation for the characteristics of the earth's crust):

$$\frac{V_P}{V_S} = \sqrt{3}$$

The time needed for the P-waves to arrive at the first sensor site is:

$$t_F = \frac{d_F}{V_P}$$

Where $t_F$ is the travel time of the P-wave from the hypocenter to the first sensor site and $d_F$ is the distance from the hypocenter to the first sensor site. The warning time for the networked EWS (neglecting processing and communications delays) is:

$$t_{warn-EWS} = t_S - t_F$$

The improvement in warning is:

$$\text{improvement} = \frac{t_{warn-EWS}}{t_{warn-standalone}} = \frac{t_S - t_F}{t_S - t_P} = \frac{\frac{d}{V_S} - \frac{d_F}{V_P}}{\frac{d}{V_S} - \frac{d}{V_P}} = \frac{\sqrt{3} - \frac{d_F}{d}}{\sqrt{3} - 1}$$

When the first sensor site is located at the epicenter ($d_F=0$, neglecting depth), the improvement ratio is:

$$\text{improvement} = 2.4$$

An improvement on the order of 2.4 is not generally considered possible in practice because of various system delays and hypocenter depths that were neglected in the above analysis. However, there can still be significant improvement, which is one reason that a networked EWS is a favored architecture.

In standard EWS systems, there are many sources of false positives caused by factors such as algorithm errors, electrical noise, mischief, or component failures, but the most common source of false positives is cultural noise: man-made vibrations that are difficult to distinguish from seismic events or that confuse seismic analysis algorithms. Reducing false positive probability by waiting for multiple sites to report trades warning time for reliability.

A networked EWS can potentially provide better false positive performance than a standalone EWS. To address the problem of false positives, a decision to distribute the warning can be postponed until several sites report the earthquake. The more sites reporting an earthquake, the more confidence there is in initiating costly actions. The time spent waiting for multiple sites, however, reduces the time available for completing protective actions; time that may be of significant value in protecting lives and reducing asset loss. However, if the reliability and confidence made possible by waiting for multiple sites to report could be achieved with only a single site, the performance of the EWS would be enhanced, helping get closer to that 2.4 improvement ratio.

The value of an EWS is measured by its ability to reduce injuries and protect assets from damage. A reliable EWS, one that avoids false positives and responds quickly to provide as much time as possible for completing protective actions, would be of significant value to those exposed to earthquake hazards.

SUMMARY OF THE DISCLOSURE

In general, in one embodiment, a method of detecting a seismic event includes detecting a primary wave of a seismic event using at least one sensor at a measurement location; using at least one parameter of the detected primary wave to determine an estimated peak ground intensity at the measurement location without determining the magnitude of the seismic event; determining an epicenter of the seismic event; and estimating the intensity of the seismic event at a specified location using the determined estimated peak ground intensity and the distance of the specified location from the epicenter.

In addition or in the alternative, this and other embodiments may include one or more of the following features.

The method can further include issuing a warning if the intensity of the seismic event is above a threshold value. Issuing the warning can include issuing the warning as a probability function. The probability function can be encoded using one parameter representing expected value and one parameter representing the deviation of the distribution.

Determining the epicenter can include using information gathered from the at least one sensor and information gathered from a sensor at another measurement location, the at least one sensor and the sensor at another measurement location connected by a communication network.

Using at least one parameter of the detected primary wave to determine an estimated peak ground intensity at the measurement location can include using an established empirical relation between the at least one parameter and the peak ground motion to determine the peak ground motion. The established empirical relation can be based upon previous earthquake data.

The at least one parameter can include amplitude information in the time domain or the spectral domain.

The at least one sensor can include an accelerometer, a GPS sensor, a displacement sensor, or a velocity sensor.

Estimating the intensity of the seismic event at a specified location can include using an established empirical relation between the peak ground intensity and the distance of the specified location from the epicenter. The established empirical relation can be based upon previous earthquake data. The empirical relation can be:

$$A = \frac{KR_0}{[(R/R_0)^N + (R/R_0)^{2N}]^{1/2N}}$$

$$C = \frac{1}{[1 + (A/A_0)^M]^{1/M}}$$

$$PGM = A \cdot C$$

where R is the distance from the surface fault trace, $R_0$ is a constant of order the length of the rupture, $A_0$ is the elastic deformation limit of rock, and M, N, and K are constants. The empirical relation can be plotted as a curve of the decay of peak ground motion over distance from the epicenter.

Detecting a primary wave of a seismic event using at least one sensor can include using a first sensor to obtain a first signal and a second sensor to obtain a second signal, correlating the first and second signals, and determining that the first and second signals correspond to a primary wave of a seismic event only if the correlation meets a set threshold value. Correlating the first and second signals comprises comparing magnitude, direction vectors, or time-of-arrival.

In general, in one embodiment, a system for detecting a seismic event includes at least two sensors configured to detect a primary wave of a seismic event and a controller, the controller configured to: use at least one parameter of the detected primary wave to determine an estimated peak ground intensity without determining the magnitude of the seismic event; determine an epicenter of the seismic event; and estimate the intensity of the seismic event at a specified location using the determined estimated peak ground intensity and the distance of the specified location from the epicenter.

In addition or in the alternative, this and other embodiments may include one or more of the following features.

The controller can be further configured to issue a warning if the intensity of the seismic event is above a threshold value. The controller can be configured to issue the warning as a probability function. The probability function can be encoded using one parameter representing expected value and one parameter representing the deviation of the distribution.

The at least two sensors can be at separate measurement locations, the measurement locations connected by a communication network.

The controller can be configured to use at least one parameter of the detected primary wave to determine an estimated peak ground intensity at the measurement location by using an established empirical relation between the at least one parameter and the peak ground motion to determine the peak ground motion. The established empirical relation can be based upon previous earthquake data.

The at least one parameter can be amplitude information in the time domain or the spectral domain.

At least one of the at least two sensors can be an accelerometer, a GPS sensor, a displacement sensor, or a velocity sensor.

The controller can be configured to estimate the intensity of the seismic event at a specified location by using an established empirical relation between the peak ground intensity and the distance of the specified location from the epicenter. The established empirical relation can be based upon previous earthquake data. The empirical relation can be:

$$A = \frac{KR_0}{[(R/R_0)^N + (R/R_0)^{2N}]^{1/2N}}$$

$$C = \frac{1}{[1 + (A/A_0)^M]^{1/M}}$$

$$PGM = A \cdot C$$

where R is the distance from the surface fault trace, $R_0$ is a constant of order the length of the rupture, $A_0$ is the elastic deformation limit of rock, and M, N, and K are constants. The empirical relation can be plotted as a curve of the decay of peak ground motion over distance from the epicenter.

A first sensor can be configured to obtain a first signal and a second sensor can configured to obtain a second signal, and a controller can be configured to correlate the first and second signals and determine that the first and second signals correspond to a primary wave of a seismic event only if the correlation meets a set threshold value. The controller can be configured to correlate the first and second signals by comparing magnitude, direction vectors, or time-of-arrival.

A method of detecting a seismic event includes detecting a primary wave of a seismic event using at least two sensors at a measurement location, wherein the at least two sensors are less than 500 m apart; using at least one parameter of the detected primary wave to determine an estimated peak ground intensity at the measurement location; determining an epicenter of the seismic event using only the at least two sensors at the measurement location; and estimating the intensity of the seismic event at a specified location using the determined estimated peak ground intensity and the distance of the specified location from the epicenter.

In addition or in the alternative, this and other embodiments may include one or more of the following features.

The at least two sensors can be less than 200 m apart, such as less than 100 m apart.

The method can further include issuing a warning if the intensity of the seismic event is above a threshold value.

Issuing the warning can include issuing the warning as a probability function. The probability function can be encoded using one parameter representing expected value and one parameter representing the deviation of the distribution.

The at least two sensors can be connected by a hard line communication network.

At least one of the at least two sensors can include an accelerometer, a GPS sensor, a displacement sensor, or a velocity sensor.

Detecting a primary wave of a seismic event using at least two sensors can include using a first sensor to obtain a first signal and a second sensor to obtain a second signal, correlating the first and second signals, and determining that the first and second signals correspond to a primary wave of a seismic event only if the correlation meets a set threshold value. Correlating the first and second signals includes comparing magnitude, direction vectors, or time-of-arrival.

The at least two sensors can be identical.

Determining the epicenter can include determining the epicenter as a probability density function in latitude and longitude. The probability density function can be encoded using one parameter representing expected value in latitude in longitude, deviation along two primary axes, and an angle of rotation. The probability density function can be determined using azimuth and dip information. The method can further include adjusting the probability density function using prior information about local geology, geometry of other measurement locations in the region, and the real-time status of other measurement locations.

In general, in one aspect, a system for detecting a seismic event includes at least two sensors configured to detect a primary wave of a seismic event, wherein the at least two sensors are less than 500 m apart and a controller. The controller is configured to use at least one parameter of the detected primary wave to determine an estimated peak ground intensity; determine an epicenter of the seismic event using only the at least two sensors at the measurement location; and estimate the intensity of the seismic event at a specified location using the determined estimated peak ground intensity and the distance of the specified location from the epicenter.

The at least two sensors can be less than 200 m apart, such as less than 100 m apart.

The controller can be further configured to issue a warning if the intensity of the seismic event is above a threshold value. The controller can be configured to issue the warning as a probability function. The probability function can be encoded using one parameter representing expected value and one parameter representing the deviation of the distribution.

The at least two sensors can be connected by a hard line communication network.

At least one of the at least two sensors comprises an accelerometer, a GPS sensor, a displacement sensor, or a velocity sensor.

A first sensor can be configured to obtain a first signal, and a second sensor can be configured to obtain a second signal. A controller can be configured to correlate the first and second signals and determine that the first and second signals correspond to a primary wave of a seismic event only if the correlation meets a set threshold value. Correlating the first and second signals can include comparing magnitude, direction vectors, or time-of-arrival.

The at least two sensors can be identical.

The controller can be configured to determine the epicenter by determining the epicenter as a probability density function in latitude and longitude. The probability density function can be encoded using one parameter representing expected value in latitude in longitude, deviation along two primary axes, and an angle of rotation. The probability density function can be determined using azimuth and dip information. The controller can be further configured to adjust the probability density function using prior information about local geology, geometry of other measurement locations in the region, and the real-time status of other measurement locations.

In general, in one aspect, a method of detecting a primary wave of a seismic event includes: obtaining a first ground vibration signal from a first sensor at a first location; obtaining a second ground vibration signal from a second sensor at a second location, the second location within 500 m of the first location; correlating the first and second signals; and only if the correlation of the first and second signals meets a set threshold, using at least one parameter of the first signal or the second signal to estimate the intensity of a seismic event.

In addition or in the alternative, this and other embodiments may include one or more of the following features.

At least one of the first sensor or the second sensor is an accelerometer, velocity sensor, or displacement sensor.

Correlating the first and second signals can include computing the difference in direction vectors of the first and second signals, and meeting the set threshold can include being less than a set difference. Correlating the first and second signals can include computing a cross-correlation peak of the first and second signals, and meeting the set threshold can include being below a set value. Correlating the first and second signals can include computing a time delay between the first and second signals, and meeting the set threshold can include being less than a set difference. Correlating the first and second signals can include computing a difference in magnitude of the first and second signals, and meeting the set threshold can include being less than a set difference.

The method can further include obtaining first and second signals at a sampling rate over 100 Hz, such as over 200 HZ, for example over 800 HZ.

The method can further include issuing a warning if the intensity of the seismic event is above a threshold value. Issuing the warning can include issuing the warning as a probability function. The probability function can be encoded using one parameter representing expected value and one parameter representing the deviation of the distribution. The obtaining and correlating steps can be repeated continuously in real time.

The at least two sensors can be less than 200 m apart, such as less than 100 m apart.

In general, in one aspect, a system for detecting a seismic event includes a first sensor at a first location, the first sensor configured to obtain a first ground vibration signal, a second sensor at a second location, the second location within 500 m of the first location and configured to obtain a second ground vibration signal, and a controller. The controller is configured to correlate the first and second signals and, only if the correlation of the first and second signals meets a set threshold, use at least one parameter of the first signal or the second signal to estimate the intensity of a seismic event.

At least one of the first or second sensors can be an accelerometer, velocity sensor, or displacement sensor.

The controller can be configured to correlate the first and second signals by computing the difference in direction vectors of the first and second signals, and meeting the set threshold can include being less than a set difference. The controller can be configured to correlate the first and second signals by computing a cross-correlation peak of the first and second signals, and meeting the set threshold can include being below a set value. The controller can be configured to correlate the first and second signals by computing a time delay between the first and second signals, and meeting the set threshold can include being less than a set difference. The controller can be configured to correlate the first and second signals by computing a difference in magnitude of the first and second signals, and meeting the set threshold can include being less than a set difference.

The first and second sensors can be configured to obtain the first and second signals at a sampling rate over 100 Hz, such as over 200 HZ, for example at least 800 HZ.

The controller can be further configured to issue a warning if the intensity of the seismic event is above a threshold value. The controller can be configured to issue the warning as a probability function. The probability function can be encoded using one parameter representing expected value and one parameter representing the deviation of the distribution.

The sensors can be configured to repeat the obtaining steps in real time, and the controller can be configured to repeat the correlating steps in real time.

The at least two sensors can be less than 200 m, such as less than 100 m apart.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
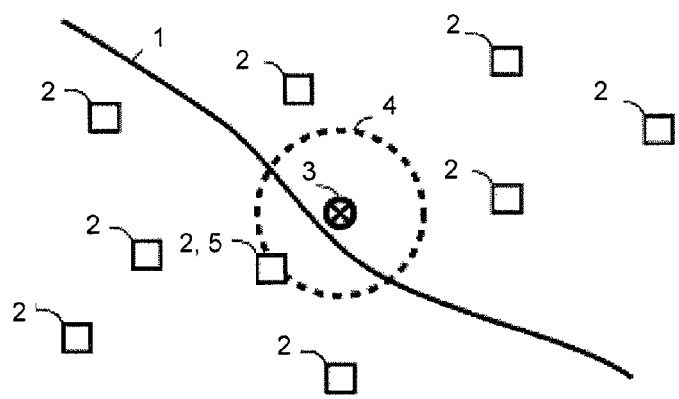
FIG. 1 depicts a regional Earthquake Warning System (EWS) with several sensor sites.

Referring to FIG. 1, a networked earthquake warning system includes geographically dispersed sites or sensor subsystems 2 placed to minimize the distance to likely earthquake centers near at least one fault 1. All sites are connected via a communications network. When an earthquake occurs at an epicenter 3, the P-wave 4 travels outwards arriving first at the closest site 5, which then sends a signal to all other affected sites 2. The warning time that the EWS can provide is better than the warning time possible with each standalone site, since the signal from the closest site 5 will arrive at the other sites 2 well before the arrival of the P-wave 4.

Figure 2:
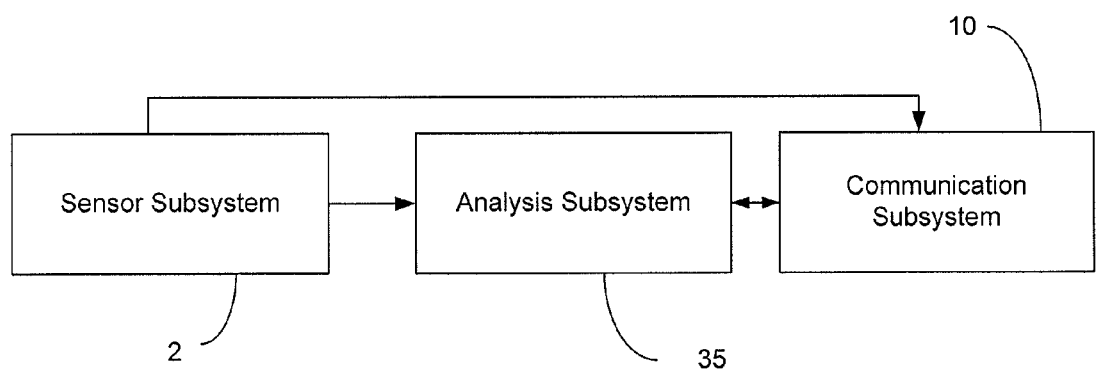
FIG. 2 is a block diagram of an earthquake warning system.

Referring to FIG. 2, an earthquake warning system consists of three subsystems, including a sensor subsystem 2, an analysis subsystem 35, and a communication subsystem 10.

The sensor subsystem 2 includes a controller and one or more ground motion sensors to record and report ground motion in real time. The sensor subsystem filters out any noise and passes collected signals or data in real time to the analysis subsystem 35.

The analysis subsystem 35 includes at least one computer or controller configured to take input from the sensor subsystem 2 and/or from the communication subsystem 10 to compute the epicenter location and to estimate imminent ground motion hazard in real time. The analysis subsystem 35 can compute the imminent ground motion hazard locally (i.e. at the given site) and at regional distances (i.e. all locations in the geographical region of the epicenter, including the site where the data was recorded and surrounding station and non-station locations). Further, the analysis subsystem 35 is configured to compute uncertainties in the estimates of ground motion and epicenter location. The estimates and uncertainties are passed from the analysis subsystem 35 to the communication subsystem 10.

The communication subsystem 10 includes a network for sending and receiving data. The communication subsystem 10 further at least one controller or computer configured to encode the estimates and uncertainties as a set of parametric data. In the preferred embodiment, the parameterization takes the form of a pair of values representing expected value and deviation in a continuous distribution function. The communication subsystem 10 transmits the parametric data as necessary to a local device for implementing local earthquake responses, to a network of similar systems in a geographic region organized as a peer network, or to a regional datacenter which collects and redistributes the data to similar systems in a geographic region. The communication subsystem 10 also receives information either from other similar systems in a peer network or from a regional datacenter, and passes the data as needed to the analysis subsystem 35.

Each of the three subsystems is described in detail below.
Sensor Subsystem

Figure 3:
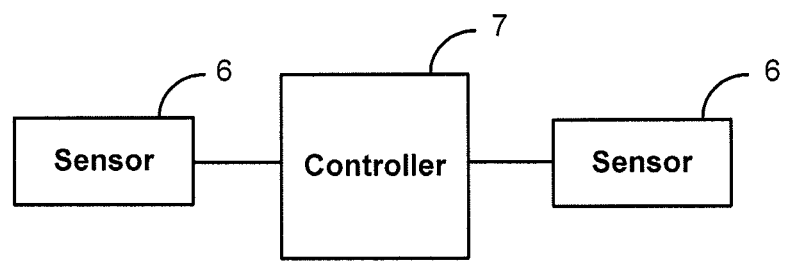
FIG. 3 is a system diagram of a single sensor site device.

Referring to FIG. 3, each sensor subsystem 2 includes a local controller 7 and two or more sensing devices 6 capable of measuring ground vibrations in at least one axis. In one embodiment, there are tri-axial sensing devices normally oriented Up, North, and East. The sensing devices may be accelerometers, velocity sensors, or displacement sensors. In one embodiment, there are two sensors, and one sensor is an accelerometer while the other sensor is a high-sample-rate GPS sensor. In another embodiment, there are three sensors, and two sensors are accelerometers while the other sensor is a high-sample-rate GPS sensor.

The sensors in a sensor subsystem 2 are located within 500 m of one another, such as within 200 m of one another, such as within 100 m of one another and are connected together by a hard line communication network.

Figure 4:
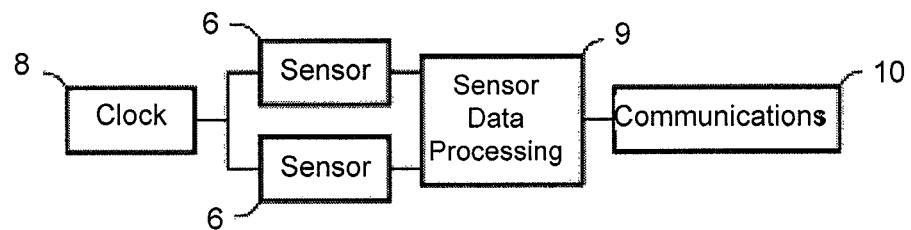
FIG. 4 is a block diagram of the signal path of a sensor site device.

The block diagram of the major components of the signal path in the controller 7 is shown in FIG. 4. The sensing devices 6 sample synchronously with a master clock 8. Synchronization errors between channels, for multi-channel sensing devices, must be low and the synchronization errors between channels of different sampling devices should be commensurate. In the preferred embodiment, channel-to-channel timing errors are kept well under 10 ns. Timing errors between sensing devices are kept under 1 μs. In one embodiment, the sensors digitally sample the sensor outputs with clocks that are synchronized between the sensors. The sensors are physically separated (up to 100 m) and clocks distributed to them from the processing unit. These clocks ensure that sample time errors between the sensors are less than 1 μs.

Figure 5:
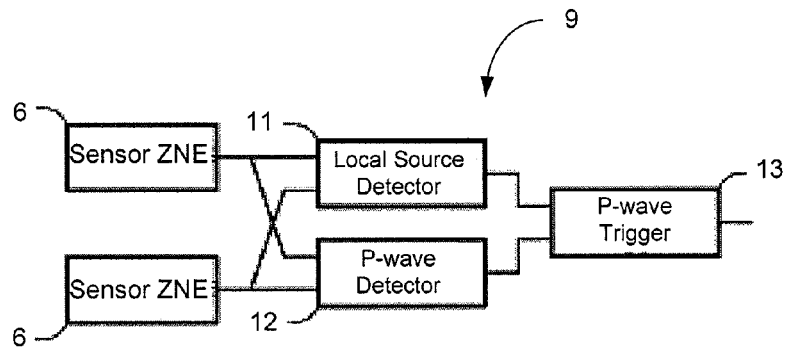
FIG. 5 is a block diagram of sensor data processing subsystem of a sensor site device.

Data from the sensors 6 is processed by the data processing subsystem 9. FIG. 5 shows the block diagram of the data processing subsystem (with sensors). The data processing subsystem 9 comprises a local source detector 11, a P-wave detector 12, and a P-wave trigger 13. The P-wave detector 12 uses the data from the sensors 6 to detect the presence of a P-wave. P-waves can be detected, for example, by looking at the background noise energy averaged over a long time period with the same estimate averaged over a short time period. When the short time value exceeds the long time value, the P-wave detector can signals that a shockwave has been detected. The local source detector 11 serves to distinguish vibrations originating close to the site, i.e., less than 1 km, such as within about 5-6 baseline lengths of the array centroid, so about 500-600 meters in the worst case from those occurring farther away. Local sources are presumed to be of human, rather than seismic, origin. The output of the P-wave detector 12 and the local source detector 11 are compared in the P-wave trigger subsystem 13, which will reject all P-waves reported by the P-wave Detector 12 if they are of local origin. As shown in FIG. 2, P-waves of seismic origin are then passed to the communications subsystem 10 for transmission to other sites or directly to the analysis subsystem 35 for use in detecting the epicenter and the intensity of the seismic event.

Figure 6:
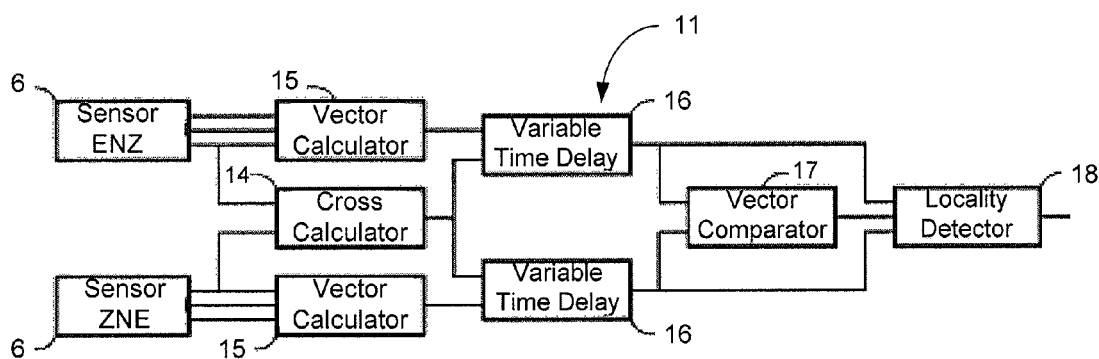
FIG. 6 is a data flow diagram of the local source detection subsystem of the sensor site device.

The block diagram of the local source detector 11 is depicted as a block diagram in FIG. 6. Data from the sensing devices 6 is processed in real time, sample-by-sample, to compute a 3-dimensional direction vector by two Vector Calculators 15. If fewer than three channels are available, the computed vector has correspondingly fewer dimensions. Each vector is described by a magnitude and three direction cosines:

$$magn = \sqrt{Z^2 + N^2 + E^2}$$
$$\alpha_Z = \cos\alpha_Z = \frac{Z}{magn}$$
$$\alpha_N = \cos\alpha_N = \frac{N}{magn}$$
$$\alpha_E = \cos\alpha_E = \frac{E}{magn}$$

Where Z, N, and E are the data samples from the three sensor channels.

A cross correlation of the data from the sensing devices is also computed by the cross correlator 14. In the preferred embodiment, the Z channel is used for cross-correlation since it is most closely correlated with initial seismic motions (P-waves are primarily vertical), but any combination of input channels can be cross-correlated. The cross-correlation for a particular delay (D) can be found by:

$$r = \frac{\sum_i [(Z_1(i) - mZ_1) * (Z_2(i-D) - mZ_2)]}{\sqrt{\sum_i (Z_1(i) - mZ_1)^2} \sqrt{\sum_i (Z_2(i-D) - mZ_2)^2}}$$

Where $Z_1$ and $Z_2$ are the Z-channels from sensors 1 and 2 respectively, $mZ_1$ and $mZ_2$ are the means of $Z_1$ and $Z_2$, and i iterates over all the samples in the input buffer.

A complete cross correlation is computed by iterating D over −maxDelta ... 0 ... maxDelta, where maxDelta is some integer multiple of a sample period:

$$maxDelta = \frac{N}{F_S}$$

Where N is some number of samples from the sensor data vector.

Figure 7:
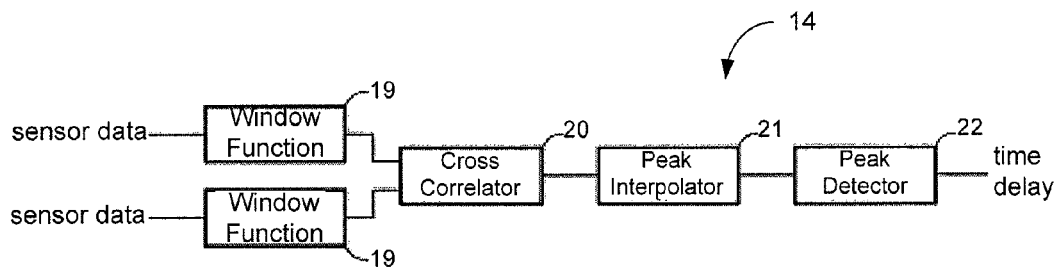
FIG. 7 shows the block diagram of cross-correlation processing.

A block diagram of the processing blocks of the cross-correlator 14 is shown in FIG. 7. The data streams from the sensing devices are passed through an (optional) window function 19. The window function 19 compensates for using a limited time-series of sensing device data. Typical window functions include Hamming, Harm, Blackman, and Kaiser. Once windowed, the data streams are passed to the cross-correlation function 20. For efficient processing, the cross-correlation routines are written as head-tail functions, which greatly reduces the amount of processing per period.

The output of the cross-correlation function 20 is used both by itself to determine if there is a local source and to find the time delay between the two sensing device data streams. To begin, if the normalized cross correlation peak is less that a particular amount, such as 20 db, such as less than 10 db, for example less than 6 db, the signals can be judged to be uncorrelated and rejected as a local source.

Figure 8:
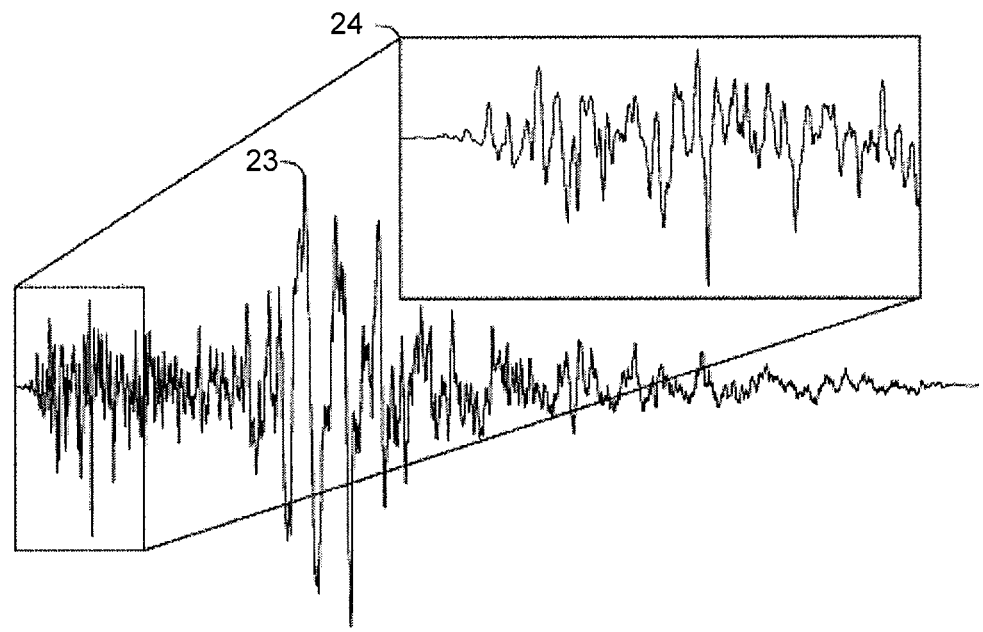
FIG. 8 shows a vertical-channel acceleration record with P-wave highlighted.
Figure 9:
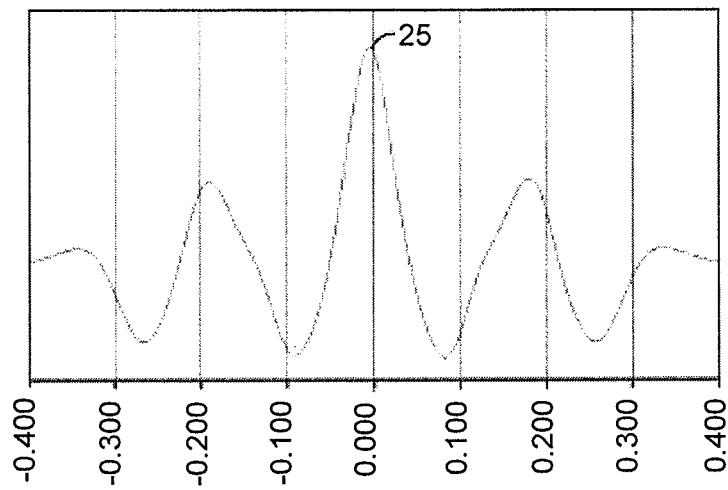
FIG. 9 shows the output of the cross correlation of FIG. 8 from 2 sensors.

Further, the cross-correlation function 20 can be used to detect the time delay between two signals because the time delay appears as peak in the output of the cross correlation. An example vertical acceleration waveform is shown in FIG. 8. The P-wave portion of this waveform is shown at 24, while the first S-wave peak is shown at 23. The output of the cross correlation is shown in FIG. 9. The peak 25 is apparent and shows a delay of 5 ms.

Figure 10:
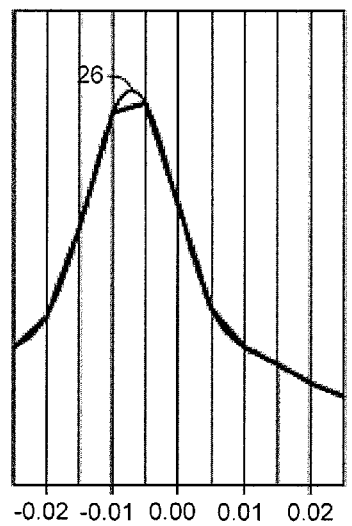
FIG. 10 shows a spline interpolation of a 200 Hz cross correlation showing a 7.5 ms time delay.

A cross correlation is shown in FIG. 9. Sub-sample time differences are possible by interpolating between the cross-correlation values. This can be achieved by interpolating the cross correlation output using a polynomial or other technique. In FIG. 10, a 200 Hz cross correlation is shown whose peak lies between 5 ms and 10 ms. A cubic spline interpolation identifies the time delay peak to sub-sample accuracy of 7 ms.

Referring back to FIG. 7, interpolation is performed at 21 on the output of the cross-correlator and the peak determined is determined at 22.

Referring back to FIG. 6, the peak is used to measure the arrival time difference between the two sensing devices. Since the range of possible time differences is small, based on the separation of the sensors and the velocities of the shock waves, the cross correlation can be calculated for a limited number of delays. For a 200 Hz sample rate, the values of D (the computed time delay in the cross correlation) can be as limited as n=−2, −1, 0, 1, 2 where D=n/Fs. The length of the data passed to the cross-correlator will need to be greater for higher-order interpolations to achieve better time resolution.

The computed time delay is used both to determine whether the detected signal is a local signal and to shift the vector data to permit further comparison.

That is, the computed time delay can be used to determine whether the two sensing device data streams fall within a narrow time window determined by the sensing device separation distance and the local P-wave velocity (nominally 6.2 km/s). For example, for a separation distance of 20 m, time differences of 3.2 ms or greater can be marked as false events. This parameter is tuned based on better estimates of the local P-wave velocities.

Further, the time delay can be used to control a variable time delay module at 16 to shift the vectors. In one embodiment, the time delay module 16 is a shift register with several taps. The tap chosen corresponds to the time delay from the cross correlator. The outputs of the two time delay modules are then synchronized in time and can be compared.

For sub-sample time delays, a linear interpolation between adjacent direction vectors is computed:

$$\beta_{Z_1}(i) = \alpha_{Z_1}(i) + \left(\frac{t_i - t_{xc}}{t_i - t_{i-1}}\right) \times [\alpha_{z_1}(i) - \alpha_{z_i}(i-1)]]$$

Where $t_{XC}$ is the time delay computed by the cross correlator, $\alpha_{Z1}(i)$ is the ith sample of the Z-channel direction cosine for sensor 1 and $t_i$ is the ith time sample (a multiple of the sample period). A more sophisticated interpolation scheme is possible, but rarely needed since the data is somewhat noisy. The other direction cosines can be similarly computed.

Referring still to FIG. 6, once time synchronized, the vectors are compared at 17. The comparison can be used to determine the direction correlation of the two vector streams. For distant sources of vibrations, those whose distance is large compared to the separation of the sensing devices, the direction vectors should be parallel. This is determined by comparing the direction cosines for the two vector streams. If the magnitude of the error exceeds a maximum threshold, such as 10 degrees, the source is judged to be local.

$$\sqrt{(\alpha_{Z_1} - \alpha_{Z_2})^2 + (\alpha_{N_1} - \alpha_{N_2})^2 + (\alpha_{E_1} - \alpha_{E_2})^2} > \text{direction\_threshold}$$

Further, the comparison can be used to determine the magnitude correlation of the two vector streams. Seismic sources should register similarly if the two sensing devices are mounted in the same manner. Local sources of vibration are likely to affect one sensing device (the nearest) more than the other. Magnitude differences of greater than a particular percentage, such as greater than 15%, can be used to indicate local sources.

The locality detector 18 detects local events so they can be rejected. Consistent with the methods described above, the output of the locality detector is true (meaning a local source) if:

vector_direction_error>direction_threshold OR
cross correlation<xcorr_threshold OR
time_delay>time_threshold OR
|magn(sensor1)−magn(sensor2)|>magn_threshold OR
ratio (magn(sensor1) to magn(sensor2))>magn_threshold OR
ratio (magn(sensor2) to magn(sensor1))>magn_threshold OR
|time(P-wave 1)−time(P-wave 2)|>time_threshold OR
ratio (vertical to horizontal magnitudes)<P2S_threshold As shown above, if the P-wave detector has detected a P-wave, further tests can be done on the signal to filter out noise. In one embodiment, because a P-wave is a specifically identified shockwave, it will have "triggers" in the signals, or points at time in which the software has independently determined that there is something resembling a P-wave. The triggering algorithm will typically be a ratio of short-to-long-term average amplitudes. If a trigger has been detected in each sensor, then the time delay should not exceed a certain threshold value, such as about 50 ms or more for a baseline length of 100 m.

In addition, for signals identified as P-waves, the wave can be analyzed to determine whether the vertical to horizontal ratio is correct. That is, P-wave motions are predominantly vertical, while S waves are predominantly horizontal, and surface waves may have an even mix (Rayleigh waves, which is how most local sources propagate). For example, the P2S threshold can be 2, i.e. if the vertical channel is not at least 2 times the horizontal channels it's a local source.

Precise measurements of time differences using cross correlation benefits from higher sample rates. In the preferred embodiment, sample rates of at least 100 HZ, such as at least 200 Hz are used. Higher sample rates, such as 800 Hz or 1000 Hz, can be used when local conditions are favorable (close to the fault, hard rock geology). Cultural noise tends to contain higher frequencies than seismic vibrations. Higher sample rates make it easier to detect cultural noise that might otherwise appear as aliasing artifacts unless very aggressive anti-aliasing input filters are used. The higher frequency sampling reduces the cost and distortions of aggressive filters.

If the vectors represent waves of local origin, and no P-waves have been detected, the vibrations should be ignored. That is, local source waves, as identified by a combination of vertical-to-horizontal ratios, time delays and vector correlations as described above, should be disregarded.

The signals from the sensing devices should be well correlated for vibrations from seismic sources. If the correlation is low, the signals are rejected. The sensing devices must be similarly mounted to achieve similar responses to ground vibrations. The system uses vibrations from all seismic events to evaluate the degree of correlation possible and to adjust its comparison algorithms to compensate for differences in sensing device responses. These techniques also provide good rejection for electrical noise that might otherwise contribute to an increase in false positives.

Many of the techniques described rely on accurate estimates of local parameters such as P-wave velocity. As each event is detected and measured by the system, these parameters can be measured via comparisons with other sites in post-event analysis. The parameters are then adjusted to improve the systems accuracy in evaluating P-waves.

Referring back to FIG. 2, after vibrations from local sources have been eliminated and the P-waves detected by the sensor subsystem 2, the data from the detected P-waves are sent via the communications subsystem 10 to other devices in the EWS and/or to the analysis subsystem 35.

Analysis Subsystem

Figure 11:
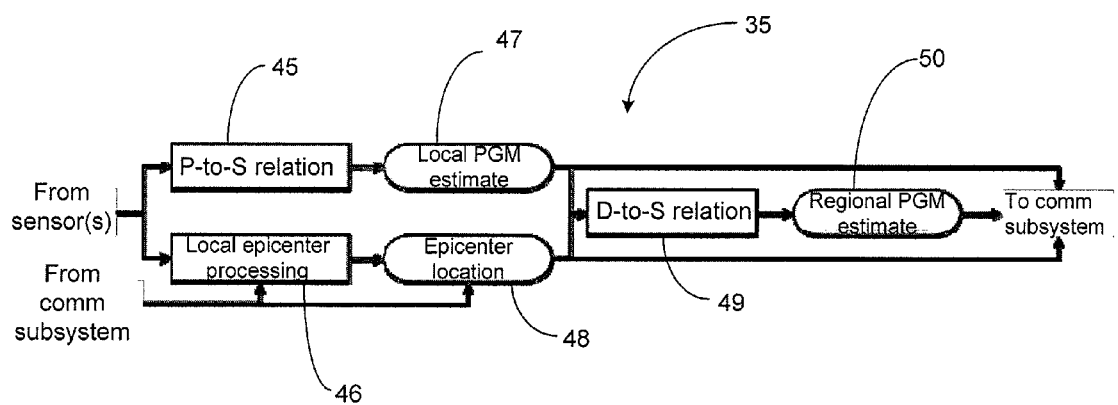
FIG. 11 is a flow diagram showing the processing of inputs and the generation of outputs within the analysis subsystem.

The analysis subsystem 35 is described in detail in the data flow diagram in FIG. 11. The analysis subsystem 35 has three components: (1) the P-to-S relation 45, which involves establishing an empirical relation between one or more parameters of the P-wave of the seismic event at a measurement location (i.e. at the location of the sensor subsystem 2) and the observed peak ground motion in the same location; (2) a local epicenter processing component 46, which involves determining the epicenter of the seismic event; and (3) the D-to-S relation 49, which involves establishing an empirical relation between the peak ground motion and the distance from the epicenter.

P-to-S Relation

As noted above, the P-to-S relation involves establishing a relation between one or more parameters of the P-wave at a measurement location and the observed peak ground motion in the same location. This empirical relation is based on seismic data from a large number of historical events, which are classified by geographic region, depth, source mechanism and any other parameter as necessary, or examined in aggregate. The P-wave parameters include amplitude information in the time domain or the spectral domain, and other properties of the P-wave in either the time domain or the spectral domain. The peak ground motion is expressed as jerk, acceleration, velocity, displacement, or spectral acceleration in broadband or in any frequency band of interest. The functional form of the empirical relation may be linear, log-linear or any other form. The empirical relation may also be a function of distance from the source or other variables. This relation is called the P-to-S relation.

In one embodiment, data is collected from approximately 100 previous earthquakes in the region of interest. The earthquakes span in magnitude from $M_L$ 3.0 to the largest available events. Because of the need for high-quality seismic records, more recent earthquakes are preferred in the analysis. This preference is limited by the rarity of events at the upper end of the magnitude scale, and by necessity some of the largest events will be significantly older than most of the smaller events. This is permissible because the stronger ground motions of large events are visible on noisier records than ground motions from small earthquakes. The dataset is chosen such that the number of earthquakes at each magnitude is approximately constant to avoid overweighting the small magnitudes due to their large numbers.

Multiple seismic records are analyzed for each earthquake, with breakdowns by distance from the epicenter, site classification of the sensor, and where possible the azimuth of the station relative to the principal component vectors of the earthquake. This latter classification is only possible for earthquakes above $M_w$, 4.0 or so, for which reliable moment tensors have been computed. For each record, the P-wave is analyzed in the time and frequency domains, and the peak ground motions from the S-wave or surface waves are recorded. Correlations are computed between the P-wave analysis products and peak ground motions, and the best correlation, or a combined suite of the best correlations, is used to generate the empirical P-to-S relation.

Figure 12:
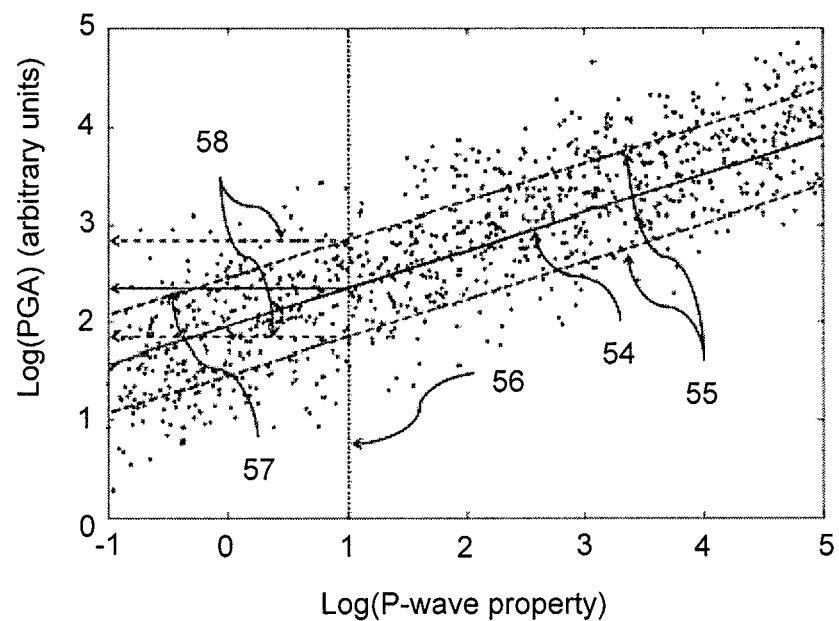
FIG. 12 is a graph representing an example empirical relation between a hypothetical P-wave property and the intensity of ground motion at a given location.

FIG. 12 shows an example of an empirical P-to-S relation, in which peak ground acceleration (PGA) is log-linearly related to some parameter of the P-wave. Each point on the graph is an individual observation of this P-wave parameter and PGA for a historical earthquake. The solid line 54 is the least-squares best fit to these data, and the dashed lines 55 are the 95% confidence intervals of this fit. FIG. 12 shows a graphical example of a hypothetical observation of this P-wave parameter that is equal to 10 in some arbitrary units. The intersection of the vertical line 56 with the best-fit and 95% confidence lines 54, 55 produces the estimated PGA 57 and 95% confidence intervals for the estimated PGA 58.

The choice of which P-wave parameter or combination of parameters to use depends on a variety of factors, including the robustness of a parameter to variations in source mechanism and orientation (i.e., a strike-slip earthquake vs. a thrust vs. a normal earthquake), the speed at which an estimate can be made reliably using the parameter, and the usability of the parameter over the entire intensity range of interest. At the most basic level, the choice of parameters will be dominated by which parameters are most positively correlated with peak ground motion, and exhibit the least scatter, i.e. those parameters for which the uncertainty in the value of the parameter yields the least uncertainty in the estimate of ground motion. Because a single parameter may not fulfill all the requirements simultaneously, a combination of parameters may be used in combination with a weighting scheme that maximizes the benefit of each parameter. For example, an amplitude-based parameter may exhibit less scatter for small ground motions but saturate for very large ground motions. In contrast, a frequency-based parameter may not suffer from saturation for large ground motions but from low signal-to-noise ratio for smaller ground motions. An appropriate scheme in this example would give more weight to the amplitude-based parameter for smaller estimated ground motions and more weight to the frequency-based parameter for large estimates.

Local Epicenter Processing

In some embodiments, the epicenter of an event is determined using data only from a single sensor subsystem 2. In other embodiments, the epicenter is determined using a combination of data from the local sensor subsystems 2 and from other stations communicated over a network (via the communication subsystem 10).

In some systems, a single sensor can be used to determine the epicenter. In the case of sensors consisting of two horizontal axes, the amplitude and sign of the first motions of the P-wave on both channels are combined as orthogonal components of a vector, and used to determine the back-azimuth from a sensor to the epicenter. In one embodiment, triaxial sensors are used, and the amplitude and sign of the first motion of the P-wave on the vertical channel is additionally used to determine the dip of the incident P-wave. A 1-D velocity model of the region is used to convert measured dip into epicentral distance. This may be done in real time with frequency-wave number integration. In one embodiment, the velocity model is used to generate a prior lookup table of conversions between measured dip and epicentral distance. This technique can be used alone (i.e. to determine the epicenter using only one sensor) or it can be used to augment other techniques to more accurately identify epicenter location.

In the one embodiment, two sensors are located at the same site with a known baseline distance and bearing, and the relative time-of-arrival of the first motion is used to estimate back-azimuth via the equation:

$$\theta = \cos^{-1}\left(\frac{V_p}{d}\Delta t\right)$$

Where $\theta$ is the azimuth in radians, $V_p$ is the local apparent velocity of the P-wave in meters per second, d is the baseline distance in meters (20 to 100 meters in the preferred embodiment) and $\Delta t$ is the time delay in seconds between the two sensors. Measured back-azimuth from P-wave first motions carries a 180° ambiguity, and back-azimuth from arrival time differences carries a symmetrical ambiguity about the baseline bearing. The two measurements of back-azimuth are used to resolve the ambiguity by selecting the branches of the two measurements which are closest in azimuth to one another. A 3-D velocity model, when one is available, is used to generate a correction table for back-azimuth due to refraction of seismic waves. Using this technique, a single station can be used that has two or more sensors located therein (i.e. within 500 m, such as within 200 m, for example within 100 m) to determine the epicenter—no other stations are required.

Figure 13:
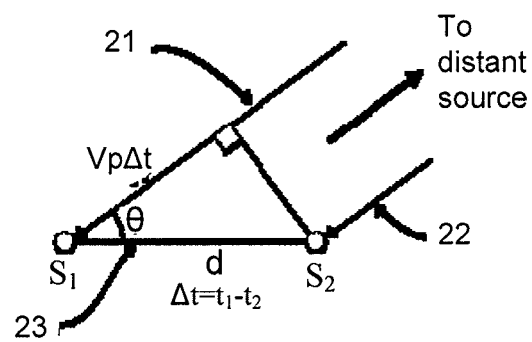
FIG. 13 shows an example of determining azimuth from time-of-arrival.
Figure 14:
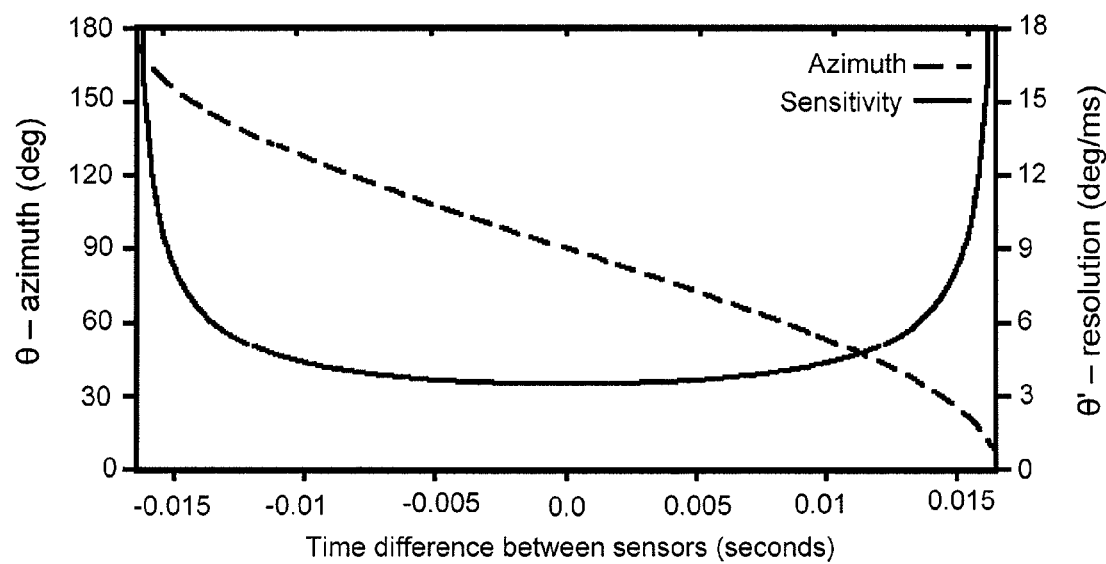
FIG. 14 is a graph showing azimuth resolution and time difference.

FIG. 13 shows two sensor locations (S1 and S2) separated by some distance d (23) receiving shockwaves from a distant source. The shockwaves arrive at the sensors along ray paths 21 and 22. FIG. 14 is a graphical depiction of the equation used to estimate back-azimuth described above and shows the angular resolution accuracy of a cross correlation based on the arrival time difference at the two sensors in FIG. 13. This graph is for two sensors separated by 100 m.

In one embodiment, Voronoi cells are constructed around all the operational sites in the EWS, and the knowledge that no other site has detected ground motion is used to localize the source to within the local Voronoi cell. As time progresses and no other stations report triggers, the locus of points in which the epicenter can exist is reduced around the first station to trigger. This requires constant information about the state of health of the network, as well as the status of all surrounding stations with regards to having detected ground motion. This information is provided asynchronously by the communication subsystem 10 whenever the state of one or more stations changes. If a neighboring station is reported to have failed the Voronoi cell for the initial station is recomputed in real time and the locus of possible epicenters is updated to reflect this change.

In one embodiment, the local epicenter processing component 46 retains locally a map of the geology within its Voronoi cell and neighboring cells. This includes fixed data such as the locations of known fault lines and their assessed seismic hazards, as well as variable data such as the locations of all recent earthquakes within the Voronoi cell. These data are combined with azimuth and dip data, and with the Voronoi cell itself, to generate a probability distribution in two dimensions (latitude/longitude) of the likely location of the epicenter. If one or more neighboring stations reports an event, this information is incorporated in the local epicenter estimate, and is communicated via the communication subsystem to the rest of the network.

D-to-S Relation

A separate empirical relation is established describing the variation of peak ground motion with distance from the seismic source. This empirical relation is based on seismic data from a large number of historical events, which are classified by geographic region, depth, source mechanism and any other parameter if the relation is found to depend strongly on these parameters. If the variation in the relation with these parameters is small compared to the scatter in the data, the events are examined in the aggregate to arrive at a uniform D-to-S relation. The peak ground motion is expressed in the same terms as for the empirical relation to P-waves above. The distance is described from the hypocenter, epicenter, fault plane or surface fault trace. The empirical relation may take any functional form, but must be explicitly finite at a distance of zero. This relation is called the D-to-S relation.

In the preferred embodiment, the D-to-S relation follows the theoretical functional form:

$$A = \frac{KR_0}{[(R/R_0)^N + (R/R_0)^{2N}]^{1/2N}}$$

$$C = \frac{1}{[1 + (A/A_0)^M]^{1/M}}$$

$$PGM = A \cdot C$$

where R is the distance from the surface fault trace, $R_0$ is a constant of order the length of the rupture, $A_0$ is the elastic deformation limit of rock, and M, N, and K are constants. The values of M, N, and K are determined by analyzing the same ground motion dataset as is used for the P-to-S relation. This generates a family of curves which vary according to the rupture length $R_0$. A is the amplitude of a theoretical pure elastic medium, which is in theory unbounded at R=0. Because rock has an elastic deformation limit, the final amplitude must be scaled by the saturation constant C. This yields a finite solution at all distances from the source from zero to infinity.

Figure 15:
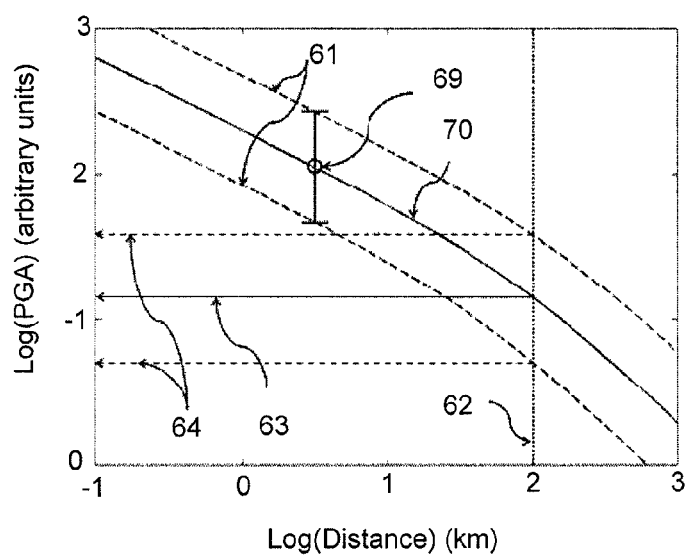
FIG. 15 is a graph representing the estimate with uncertainties of impending ground motion at a single site, and the empirical ground motion curve as a function of epicentral distance which is derived from this data.

FIG. 15 shows graphically how the hypothetical observation in FIG. 12 is used to estimate ground motions at all distances from the source. If the hypothetical station used in FIG. 12 is said to be at a distance of 3 km from the source, the estimated PGA from FIG. 12 with 95% confidence intervals plots as an open symbol with error bars 69 on FIG. 13. The D-to-S relation is scaled to fit the estimated PGA 70, and 95% confidence curves are scaled to fit the 95% error bars in the PGA estimate 71. Once the curves are correctly scaled, the estimated ground motion at any other distance can be read off the graph. In this example, the PGA at a station 100 km from the source 62 is estimated 63 with 95% confidence intervals 64.

Streaming of Data through Analysis Subsystem

Referring back to FIG. 11, data is streamed in real time from the sensor subsystem 2 and fed into the P-to-S relation 45 and the local epicenter processing 46. Asynchronous data from the communication subsystem 10 is also fed into the local epicenter processing as it arrives. The P-to-S relation 45 generates a probability distribution of impending peak ground motion at the local site 47, and local epicenter processing produces a probability distribution of epicenter location 48. If the epicenter location is already estimated from data from the network, this data is passed from the communication subsystem 10 and overrides the local epicenter result, and may be compared with the local result to assess uncertainties. These probabilities are reported to the communication subsystem 10 individually, and their information is combined and fed into the D-to-S relation 49, which produces a regional curve of impending peak ground motion 50. This data is also reported to the communication subsystem 10.

Estimated uncertainties due to the P-to-S relation and the epicenter estimate are propagated through to the regional curve from the D-to-S relation using standard error propagation methodologies, which are not discussed in detail herein. The final total uncertainty in the regional curve is passed to the communication subsystem 10.

Communication Subsystem

Referring back to FIG. 2, the communication subsystem 10 is responsible for providing communication among the sensor subsystems 2 and between the sensor subsystems 2 and the analysis subsystem 35.

Thus, the estimates of local and regional ground motion and epicenter location are passed to the communication subsystem 10, which distributes the estimates as needed to a local EWS, to a regional network of peer sites, or to a master datacenter for redistribution to regional sites. The communication subsystem 10 also receives data from other peer sites or from a master datacenter, and passes the data as needed to the analysis subsystem 35 for incorporation into the local analysis.

Uncertainty in the estimates of local and regional ground motions, and in epicenter location, are continuously recorded and propagated within the analysis subsystem 35. Uncertainties are derived from a combination of the quality and consistency of input data from the sensor subsystems 2 and communication subsystem 10, and the inherent uncertainty of the predetermined relation between P-waves and ground motions 45. The uncertainties are passed from the analysis subsystem 35 to the communication subsystem 10, which encodes them into a set of parametric values for transmission over a network.

The communication subsystem 10 can include system for sending and receiving data (such as Ethernet, wireless, etc.), a module for authenticating devices with which communications are performed, a system for protecting these communications from interference (such as encryption), a system for ensuring that all communications are completed successfully (a protocol), and/or a system to detect errors in data communicated (ECC).

Probabilistic Representation of Estimated Intensity

The communication subsystem 10 is configured to communicate the probability distribution of the epicenter and ground motions as a table or a piecewise-linear function with varying number of data points. One possible embodiment of the piecewise-linear approximation is simply the transmission of probability at every point down to the desired resolution of the probability function, i.e. as a raster of probabilities. This is computationally simple but expensive to transmit. In the preferred embodiment, the probability distribution function is approximated as a Gaussian distribution, and is encoded using two parametric values ("metrics"): one representing expected value (ev) and one representing the deviation in the distribution (dev). In the preferred embodiment, the parameter ev encodes the mean of the distribution, and the parameter dev encodes the standard deviation. Other representations are possible: dev can encode the variance, the full-width-at-half-maximum, the 95% confidence interval, or any other measure of the deviation. In the preferred embodiment, the probability distribution of impending peak ground motion is approximated by the function $$P(PGM) = \frac{1}{\sqrt{2\pi(dev)^2}} e^{-\frac{(PGM-ev)^2}{2(dev)^2}}$$

where PGM is expressed in linear or logarithmic form.

Other probability functions are possible. A Cauchy distribution where ev encodes the location and dev encodes the scale follows the form $$P(PGM) = \frac{1}{\pi(dev)\left[1+\left(\frac{PGM-ev}{dev}\right)^2\right]}.$$

A Laplace distribution with the same encoding follows the form $$P(PGM) = \frac{1}{2(dev)} e^{-\frac{|PGM-ev|}{dev}}.$$

Non-continuous distribution functions are also acceptable. For example, if maximum and minimum possible ground motions are known (mn and mx), and the likelihood of ground motion intensity on that interval is judged to be equal (or not enough is known to generate a more realistic probability distribution), the uniform distribution function applies:

$$P(PGM) = \begin{cases} \frac{1}{mx - mn} & \text{for } mn \le PGM \le mx \\ 0 & \text{otherwise} \end{cases}$$

In the degenerate case, if only an estimated peak ground motion is known and no uncertainty is available, the probability becomes a Dirac delta function:

$$P(PGM) = \begin{cases} \infty & \text{for } PGM = ev \\ 0 & \text{otherwise} \end{cases}$$

in which case the system behaves in the same manner as the current state of the art, i.e. as a binary warning.

When encoding epicenter location, the same probability functions are extended to two dimensions. In the implementation as a Gaussian distribution, this leads to four metrics: $ev_{lat}$, $ev_{lon}$, $dev_{lat}$ and $dev_{lon}$. This is not the most general case of the multivariate Gaussian distribution. The generalized form requires that dev be expressed as a covariance matrix. In this implementation, the components of dev are labeled $dev_{lat,lon}$, $dev_{lon,lon}$, $dev_{lon,lat}$ and $dev_{lat,lat}$. This form is expressed more efficiently as the deviations along the principal axes, plus a rotation angle: $dev_1$, $dev_2$, and $\theta$. This latter form is the preferred embodiment.

Communications

The communication subsystem 10 facilitates asynchronous communication between the analysis subsystem and the broader EWS shown in FIG. 1. The communication subsystem 10 thus includes at least a single device to interpret earthquake warnings and convert them into appropriate responses. In one implementation, the broader EWS also includes a regional datacenter which receives and distributes data via the Internet to identical systems which are geographically distributed in the region of interest. The broader EWS may take the form of a peer-to-peer network of identical systems without a regional datacenter.

In addition to implementing communication protocols between the local system, the regional network and the response device(s), the communication subsystem 10 is responsible for encoding the estimates of ground motion and epicenter location and their respective uncertainties for efficient communication over the network.

In one embodiment, a warning is issued when the calculated intensity has reached a certain threshold level.

What is claimed is:

1. A method of detecting a seismic event, comprising:
   detecting a primary wave of a seismic event using at least one sensor at a measurement location;
   using at least one parameter of the detected primary wave to determine an estimated peak ground intensity at the measurement location without determining the magnitude of the seismic event;
   determining an epicenter of the seismic event;
   determining a distance of the measurement location from the epicenter; and
   estimating the intensity of the seismic event at a specified location that is different from the measurement location using the determined estimated peak ground intensity at the measurement location, the determined distance of the measurement location from the epicenter, and a distance of the specified location from the epicenter.

2. The method of claim 1, further comprising issuing a warning if the intensity of the seismic event is above a threshold value.

3. The method of claim 2, wherein issuing the warning comprises issuing the warning as a probability function.

4. The method of claim 3, wherein the probability function is encoded using one parameter representing expected value and one parameter representing the deviation of the distribution.

5. The method of claim 1, wherein determining the epicenter comprises using information gathered from a first sensor and information gathered from a second sensor at another measurement location, the first sensor and the second sensor at another measurement location connected by a communication network.

6. The method of claim 1, wherein using at least one parameter of the detected primary wave to determine an estimated peak ground intensity at the measurement location comprises using an established empirical relation between the at least one parameter and the peak ground motion to determine the peak ground motion.

7. The method of claim 6, wherein the established empirical relation is based upon previous earthquake data.

8. The method of claim 1, wherein the at least one parameter comprises amplitude information in the time domain or the spectral domain.

9. The method of claim 1, wherein the at least one sensor comprises an accelerometer, a GPS sensor, a displacement sensor, or a velocity sensor.

10. The method of claim 1, wherein estimating the intensity of the seismic event at a specified location comprises using an established empirical relation between the peak ground intensity and the distance of the specified location from the epicenter.

11. The method of claim 10, wherein the established empirical relation is based upon previous earthquake data.

12. The method of claim 10, wherein the empirical relation comprises:

$$A = \frac{KR_0}{[(R/R_0)^N + (R/R_0)^{2N}]^{1/2N}}$$

$$C = \frac{1}{[1 + (A/A_0)^M]^{1/M}}$$

$$PGM = A \cdot C$$

where R is the distance from the surface fault trace, $R_0$ is a constant of order the length of the rupture, A is the amplitude of a theoretical pure elastic medium, C is a saturation constant, $A_0$ is the elastic deformation limit of rock, M, N, and K are constants, and PGM is the peak ground magnitude.

13. The method of claim 10, wherein the empirical relation can be represented as a curve of the decay of peak ground motion over distance from the epicenter.

14. The method of claim 1, wherein detecting a primary wave of a seismic event using at least one sensor comprises using a first sensor to obtain a first signal and a second sensor to obtain a second signal, correlating the first and second signals, and determining that the first and second signals correspond to a primary wave of a seismic event only if the correlation meets a set threshold value.

15. The method of claim 14, wherein correlating the first and second signals comprises comparing vector magnitude, direction vectors, or time-of-arrival.

16. A system for detecting a seismic event, comprising:
at least two sensors at a measurement location, the at least two sensors configured to detect a primary wave of a seismic event;
a controller, the controller configured to:
use at least one parameter of the detected primary wave to determine an estimated peak ground intensity without determining the magnitude of the seismic event;
determine an epicenter of the seismic event;
determining a distance of the measurement location from the epicenter; and
estimating the intensity of the seismic event at a specified location that is different from the measurement location using the determined estimated peak ground intensity at the measurement location, the determined distance of the measurement location from the epicenter, and a distance of the specified location from the epicenter.

17. The system of claim 16, wherein the controller is further configured to issue a warning if the intensity of the seismic event is above a threshold value.

18. The system of claim 17, wherein the controller is configured to issue the warning as a probability function.

19. The system of claim 18, wherein the probability function is encoded using one parameter representing expected value and one parameter representing the deviation of the distribution.

20. The system of claim 16, wherein the at least two sensors are at separate measurement locations, the measurement locations connected by a communication network.

21. The system of claim 16, wherein the controller is configured to use at least one parameter of the detected primary wave to determine an estimated peak ground intensity at the measurement location by using an established empirical relation between the at least one parameter and the peak ground motion to determine the peak ground motion.

22. The system of claim 21, wherein the established empirical relation is based upon previous earthquake data.

23. The system of claim 16, wherein the at least one parameter comprises amplitude information in the time domain or the spectral domain.

24. The system of claim 16, wherein at least one of the at least two sensors is an accelerometer, a GPS sensor, a displacement sensor, or a velocity sensor.

25. The system of claim 16, wherein the controller is configured to estimate the intensity of the seismic event at a specified location by using an established empirical relation between the peak ground intensity and the distance of the specified location from the epicenter.

26. The system of claim 25, wherein the established empirical relation is based upon previous earthquake data.

27. The system of claim 25, wherein the empirical relation comprises:

$$A = \frac{KR_0}{[(R/R_0)^N + (R/R_0)^{2N}]^{1/2N}}$$

$$C = \frac{1}{[1+(A/A_0)^M]^{1/M}}$$

$$PGM = A \cdot C$$

where R is the distance from the surface fault trace, $R_0$ is a constant of order the length of the rupture, A is the amplitude of a theoretical pure elastic medium, C is a saturation constant, $A_0$ is the elastic deformation limit of rock, M, N, and K are constants, and PGM is the peak ground magnitude.

28. The system of claim 25, wherein the empirical relation can be plotted as a curve of the decay of peak ground motion over distance from the epicenter.

29. The system of claim 16, wherein a first sensor is configured to obtain a first signal and a second sensor is configured to obtain a second signal, and wherein a controller is configured to correlate the first and second signals and determine that the first and second signals correspond to a primary wave of a seismic event only if the correlation meets a set threshold value.

30. The system of claim 29, wherein the controller is configured to correlate the first and second signals by comparing vector magnitude, direction vectors, or time-of-arrival.

31. A method of detecting a seismic event, comprising:
detecting a primary wave of a seismic event using at least two sensors at a measurement location, wherein the at least two sensors are less than 500 m apart;
using at least one parameter of the detected primary wave to determine an estimated peak ground intensity at the measurement location;
determining an epicenter of the seismic event using only the at least two sensors at the measurement location; and
estimating the intensity of the seismic event at a specified location that is different from the measurement location using the determined estimated peak ground intensity at the measurement location, the determined distance of the measurement location from the epicenter, and a distance of the specified location from the epicenter.

32. The method of claim 31, wherein the at least two sensors are less than 200 m apart.

33. The method of claim 32, wherein the at least two sensors are less than 100 m apart.

34. The method of claim 31, further comprising issuing a warning if the intensity of the seismic event is above a threshold value.

35. The method of claim 34, wherein issuing the warning comprises issuing the warning as a probability function.

36. The method of claim 35, wherein the probability function is encoded using one parameter representing expected value and one parameter representing the deviation of the distribution.

37. The method of claim 31, wherein the at least two sensors are connected by a hard line communication network.

38. The method of claim 31, wherein at least one of the at least two sensors comprises an accelerometer, a GPS sensor, a displacement sensor, or a velocity sensor.

39. The method of claim 31, wherein detecting a primary wave of a seismic event using at least two sensors comprises using a first sensor to obtain a first signal and a second sensor to obtain a second signal, correlating the first and second signals, and determining that the first and second signals correspond to a primary wave of a seismic event only if the correlation meets a set threshold value.

40. The method of claim 39, wherein correlating the first and second signals comprises comparing magnitude, direction vectors, or time-of-arrival.

41. The method of claim 31, wherein the at least two sensors are identical.

42. The method of claim 31, wherein determining the epicenter comprises determining the epicenter as a probability density function in latitude and longitude.

43. The method of claim 42, wherein the probability density function is encoded using one parameter representing expected value in latitude in longitude, deviation along two primary axes, and an angle of rotation.

44. The method of claim 42, wherein the probability density function is determined using azimuth and dip information.

45. The method of claim 42, further comprising adjusting the probability density function using prior information about local geology, geometry of other measurement locations in the region, and the real-time status of other measurement locations.

46. A system for detecting a seismic event, comprising:
at least two sensors configured to detect a primary wave of a seismic event, wherein the at least two sensors are less than 500 m apart;
a controller, the controller configured to:
use at least one parameter of the detected primary wave to determine an estimated peak ground intensity;
determine an epicenter of the seismic event using only the at least two sensors at the measurement location; and
estimating the intensity of the seismic event at a specified location that is different from the measurement location using the determined estimated peak ground intensity at the measurement location, the determined distance of the measurement location from the epicenter, and a distance of the specified location from the epicenter.

47. The system of claim 46, wherein the at least two sensors are less than 200 m apart.

48. The system of claim 47, wherein the at least two sensors are less than 100 m apart.

49. The system of claim 46, wherein the controller is further configured to issue a warning if the intensity of the seismic event is above a threshold value.

50. The system of claim 49, wherein the controller is configured to issue the warning as a probability function.

51. The system of claim 50, wherein the probability function is encoded using one parameter representing expected value and one parameter representing the deviation of the distribution.

52. The system of claim 46, wherein the at least two sensors are connected by a hard line communication network.

53. The system of claim 46, wherein at least one of the at least two sensors comprises an accelerometer, a GPS sensor, a displacement sensor, or a velocity sensor.

54. The system of claim 46, wherein a first sensor is configured to obtain a first signal and a second sensor is configured to obtain a second signal, and wherein a controller is configured to correlate the first and second signals and determine that the first and second signals correspond to a primary wave of a seismic event only if the correlation meets a set threshold value.

55. The system of claim 54, wherein correlating the first and second signals comprises comparing magnitude, direction vectors, or time-of-arrival.

56. The system of claim 46, wherein the at least two sensors are identical.

57. The system of claim 46, wherein the controller is configured to determine the epicenter by determining the epicenter as a probability density function in latitude and longitude.

58. The system of claim 57, wherein the probability density function is encoded using one parameter representing expected value in latitude in longitude, deviation along two primary axes, and an angle of rotation.

59. The system of claim 57, wherein the probability density function is determined using azimuth and dip information.

60. The system of claim 57, wherein the controller is further configured to adjust the probability density function using prior information about local geology, geometry of other measurement locations in the region, and the real-time status of other measurement locations.

61. A method of detecting a primary wave of a seismic event comprising:
obtaining a first ground vibration signal from a first sensor at a first location;
obtaining a second ground vibration signal from a second sensor at a second location, the second location within 500 m of the first location;
correlating the first and second signals; and
only if the correlation of the first and second signals meets a set threshold, using at least one parameter of the first signal or the second signal to estimate the intensity of a seismic event.

62. The method of claim 61, wherein at least one of the first sensor or the second sensor is an accelerometer, velocity sensor, or displacement sensor.

63. The method of claim 61, wherein correlating the first and second signals comprises computing the difference in direction vectors of the first and second signals, and wherein meeting the set threshold comprises being less than a set difference.

64. The method of claim 61, wherein correlating the first and second signals comprises computing a cross-correlation peak of the first and second signals, and wherein meeting the set threshold comprises being below a set value.

65. The method of claim 61, wherein correlating the first and second signals comprises computing a time delay between the first and second signals, and wherein meeting the set threshold comprises being less than a set difference.

66. The method of claim 61, wherein correlating the first and second signals comprises computing a difference in magnitude of the first and second signals, and wherein meeting the set threshold comprises being less than a set difference.

67. The method of claim 61, further comprising obtaining first and second signals at a sampling rate over 100 Hz.

68. The method of claim 67, wherein the sampling rate is over 200 HZ.

69. The method of claim 68, wherein the sampling rate is at least 800 HZ.

70. The method of claim 61, further comprising issuing a warning if the intensity of the seismic event is above a threshold value.

71. The method of claim 70, wherein issuing the warning comprises issuing the warning as a probability function.

72. The method of claim 71, wherein the probability function is encoded using one parameter representing expected value and one parameter representing the deviation of the distribution.

73. The method of claim 61, wherein the obtaining and correlating steps are repeated continuously in real time.

74. The method of claim 61, wherein the at least two sensors are less than 200 m apart.

75. The method of claim 61, wherein the at least two sensors are less than 100 m apart.

76. A system for detecting a seismic event, comprising:
a first sensor at a first location, the first sensor configured to obtain a first ground vibration signal;
a second sensor at a second location, the second location within 500 m of the first location and configured to obtain a second ground vibration signal; and
a controller, the controller configured to:
correlate the first and second signals; and
only if the correlation of the first and second signals meets a set threshold, use at least one parameter of the first signal or the second signal to estimate the intensity of a seismic event.

77. The system of claim 76, wherein at least one of the first or second sensors is an accelerometer, velocity sensor, or displacement sensor.

78. The system of claim 76, wherein the controller is configured to correlate the first and second signals by computing the difference in direction vectors of the first and second signals, and wherein meeting the set threshold comprises being less than a set difference.

79. The system of claim 76, wherein the controller is configured to correlate the first and second signals by computing a cross-correlation peak of the first and second signals, and wherein meeting the set threshold comprises being below a set value.

80. The system of claim 76, wherein the controller is configured to correlate the first and second signals by computing a time delay between the first and second signals, and wherein meeting the set threshold comprises being less than a set difference.

81. The system of claim 76, wherein the controller is configured to correlate the first and second signals by computing a difference in magnitude of the first and second signals, and wherein meeting the set threshold comprises being less than a set difference.

82. The system of claim 76, wherein the first and second sensors are configured to obtain the first and second signals at a sampling rate over 100 Hz.

83. The system of claim 82, wherein the sampling rate is over 200 HZ.

84. The system of claim 83, wherein the sampling rate is at least 800 HZ.

85. The system of claim 76, wherein the controller is further configured to issue a warning if the intensity of the seismic event is above a threshold value.

86. The system of claim 85, wherein the controller is configured to issue the warning as a probability function.

87. The system of claim 86, wherein the probability function is encoded using one parameter representing expected value and one parameter representing the deviation of the distribution.

88. The system of claim 76, wherein the sensors are configured to repeat the obtaining steps in real time and the controller is configured to repeat the correlating step in real time.

89. The system of claim 76, wherein the at least two sensors are less than 200 m apart.

90. The system of claim 89, wherein the at least two sensors are less than 100 m apart.

* * * * *